United States Patent
Knutson et al.

(10) Patent No.: US 6,680,591 B1
(45) Date of Patent: Jan. 20, 2004

(54) APPARATUS FOR PHASE ANGLE MONITORING OF A PLURALITY OF VIBRATING MACHINES

(75) Inventors: Rusty Roger Knutson, Woodstock, IL (US); Edward Charles Steffes, Jr., Woodstock, IL (US)

(73) Assignee: General Kinematics Corporation, Barrington, IL (US)

( * ) Notice: Subject to any disclaimer, the term of this patent is extended or adjusted under 35 U.S.C. 154(b) by 0 days.

(21) Appl. No.: 10/286,163

(22) Filed: Nov. 1, 2002

(51) Int. Cl.[7] .................................................. F16B 1/00
(52) U.S. Cl. ........................................ 318/114; 318/37
(58) Field of Search ................................. 318/114, 128, 318/558, 37, 38; 73/644

(56) References Cited

U.S. PATENT DOCUMENTS 3,477,281 A * 11/1969 Helmuth ...................... 73/664
5,054,606 A    10/1991 Musschoot ................... 198/751
6,377,900 B1 *  4/2002 Ueno et al. ................... 702/109
6,469,417 B2 * 10/2002 Shibatani ................ 310/316.01

OTHER PUBLICATIONS

Wilcoxon Research, Model P702B General Purpose Power Unit/Amplifier, 1 page, www.wilcoxon.com.
Laurel Electronics, Inc., Phase Angle & Duty Cycle Meters, 6 pages, http://www.laurels.com/phase.htm.

* cited by examiner

*Primary Examiner*—Karl Tamai
*Assistant Examiner*—Judson H. Jones
(74) *Attorney, Agent, or Firm*—Marshall, Gerstein & Borun LLP

(57) ABSTRACT

A phase angle monitoring apparatus for phase monitoring a vibratory system includes a controller that produces a phase angle control signal representative of the lead or lag between the vibratory movement of two vibrating masses. The phase angle control signal is coupled to at least one of the vibrating masses to adjust the vibration of the mass to produce a desired phase angle, for example one-hundred eighty degrees (180°).

9 Claims, 2 Drawing Sheets

APPARATUS FOR PHASE ANGLE MONITORING OF A PLURALITY OF VIBRATING MACHINES

FIELD OF THE INVENTION

The present invention relates generally to vibratory phase angle monitoring and, more specifically, to an apparatus for phase angle monitoring of a plurality of vibrating machines.

BACKGROUND OF THE INVENTION

It is known that in the normal operation of a vibratory machinery, harmful vibrations may develop which may damage the machinery and/or the supporting structure, such as a concrete factory floor. On many vibratory machines, these harmful vibrations are controlled for frequency and amplitude in order to avoid building into potentially damaging vibrations. Furthermore, these machines may contain vibration damping structures, as are well known in the art, to absorb any vibrations before they build to harmful levels.

For example, one such system for controlling a vibratory apparatus is described in U.S. Pat. No. 5,054,606. In the disclosed system, an accelerometer is provided for sensing the acceleration of vibratory movement of the vibratory machine. The signal generated by the accelerometer is transmitted to a control, which is capable of modifying the amplitude or the frequency of the vibratory movement, thereby regulating the vibratory machine.

However, in a location where there is a plurality of vibrating machines in close proximity, the vibrations generated by the machines may naturally synchronize to form a harmful resultant vibration. Thus, wherein the individual vibrations produced by any individual machine may be controlled, the resulting product of multiple machines in phase may produce damaging vibrations to the surrounding area. Accordingly, it may be desirable to monitor the vibrations produced by various machines in order to properly synchronize their vibrations and prevent the negative impact on the surrounding area.

DETAILED DESCRIPTION OF THE PREFERRED EMBODIMENT

The examples described herein are not intended to be exhaustive or to limit the scope of the invention to the precise form or forms disclosed. Rather, the following exemplary embodiments have been chosen and described in order to best explain the principles of the invention and to enable others skilled in the art to follow the teachings thereof.

Figure 1:
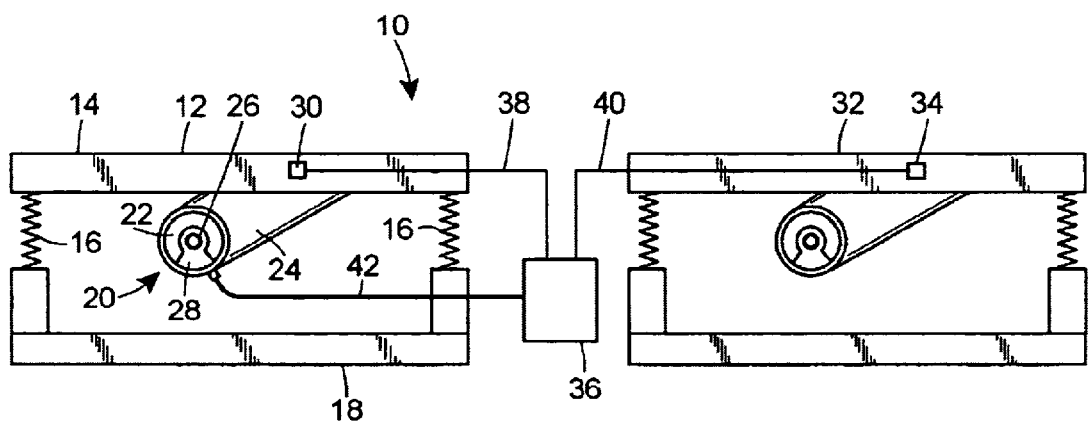
FIG. 1 is a schematic diagram illustrating an example of the disclosed apparatus.

A schematic diagram of an example vibratory phase monitoring system 10 is illustrated in FIG. 1. The phase monitoring system 10 shown includes a first vibratory apparatus 12 similar in construction to the single-mass vibratory apparatus shown in U.S. Pat. No. 5,054,606, which is hereby incorporated by reference for all purposes. For example, the first vibratory apparatus 12 includes a material-carrying member in the form of a trough 14 mounted on isolation springs 16 extending between the trough 14 and a base 16. A vibratory generator 20 includes an electric motor 22 connected to a frame 24 secured to the trough 14. The electric motor 22 includes a shaft 26, which carries an eccentric weight 28. The motor 22 may be a squirrel cage type motor whose speed may be adjusted by regulating the voltage of frequency applied.

Secured to the first vibratory apparatus 12 is a first conventional accelerometer 30 sensitive to the vibratory movement of the first vibratory apparatus 12 and capable of generating a signal responsive to such vibratory movement. The first accelerometer 30 may be supported anywhere on the first vibratory apparatus 12, including, for example, the trough 14, or the base 18. The signal generated by the first accelerometer 30 represents linear acceleration caused by vibratory movement of the first vibratory apparatus 12. This acceleration is defined by the equation $$A = k(f)^2 S$$

wherein A represents acceleration, k is a constant which is dependent, in part, on the weight of the first vibratory apparatus 12 and the material carried thereon, f is the frequency and S is the amplitude of the vibratory movement sensed by the first accelerometer 30. The signal generated by the first accelerometer 30 may be, for example, an analog signal which varies over a preselected range, e.g., 0–5 volts, according to the sensed acceleration of the first vibratory apparatus 12.

The phase monitoring system 10 shown also includes a second vibratory apparatus 32, which may be similar to the first vibratory apparatus 12. It will be understood that both the first vibratory apparatus 12 and the second vibratory apparatus 32 may be any machine producing vibrations, including, for example, shakeouts, conveyors, screeners, sand reclamation machines, feeders, two-mass vibratory systems, and the like. Furthermore, while the second vibratory apparatus 32 is illustrated as a separate apparatus from the first vibratory apparatus 12, it may be, in fact, a separate vibratory portion of the same machine such as, for example, a different section of an elongate vibratory conveyor.

Secured to the second vibratory apparatus 32 is a second accelerometer 34, which may be similar to the first accelerometer 30. The second accelerometer 34 is sensitive to the vibratory movement of the second vibratory apparatus 32 and is capable of generating a signal responsive of such vibratory movement. Similar to the previously described first accelerometer 30, the second accelerometer 34 may be supported anywhere on the second vibratory apparatus 32 and may generate a signal which may be, for example, an analog signal which varies over a preselected range according to the sensed acceleration of the second vibratory apparatus 32.

The first accelerometer 30 and the second accelerometer 34 are coupled to a phase angle controller 36 via lines 38 and 40 respectively. As is described below, the phase angle controller 36 determines the phase difference between the vibration of the first vibratory apparatus 12 and the second vibratory apparatus 32, to produce an output signal, representative of the phase difference. The phase angle controller 36 is coupled to the vibratory generator 20 via line 42 to control the vibratory generator 20. In the preferred embodiment, the vibratory generator 20 will be controlled to ensure the phase angle between the two vibrations is one hundred eighty degrees (180°).

Figure 2:
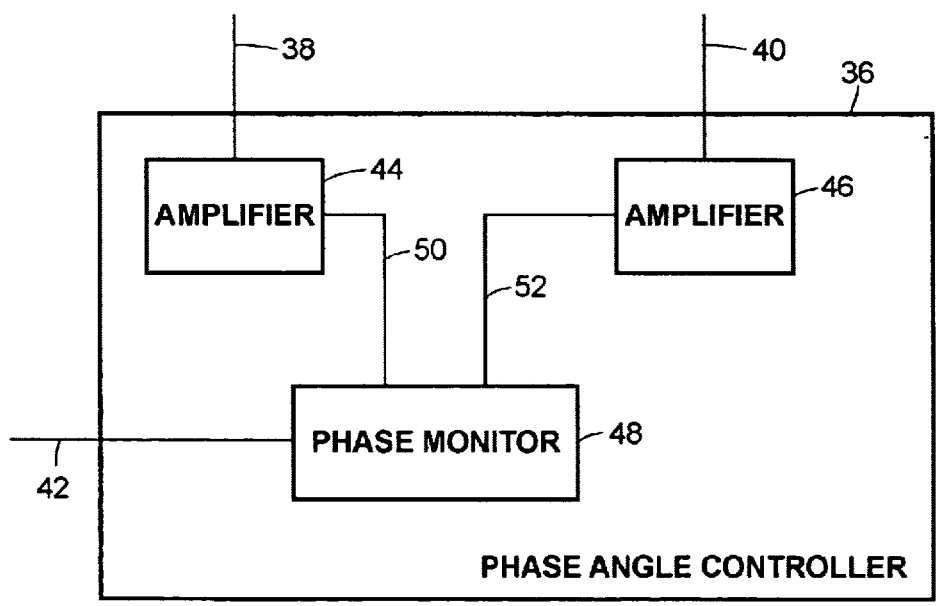
FIG. 2 is a block diagram of an example phase angle controller of FIG. 1.

Referring to FIG. 2 of the drawings, an embodiment of the phase angle controller 36 is illustrated which includes a first amplifier 44, a second amplifier 46, and a phase monitor 48. The amplifiers 44, 46 are coupled to the phase monitor via lines 50 and 52 respectively. In the illustrated embodiment, the amplifiers 44, 46, may be, for example, a Wilcoxon amplifier model no. P702B, supplied by Wilcoxon Research, Inc., Gaithersburg, Md. The amplifiers 44, 46 amplify the signal generated by the accelerometers 30, 32 and pass the amplified signals to the phase monitor 48. It will be understood by one of ordinary skill in the art that the amplifiers 44, 46 may not be necessary, depending upon the strength of the signal generated by the accelerometers 30, 32 and/or depending upon the sensitivity of the phase monitor 48.

The phase monitor 48 may be a personal computer (PC) or any other device capable of executing a phase monitoring program. For example, the phase monitor 48 may include one or more central processing units (CPUs) electrically coupled by a system interconnect to one or more memory device(s) and one or more interface circuits. In the illustrated example of FIG. 2, the phase monitor 48 is a Laurel Electronic Phase Meter model no. L80010FR, supplied by Laurel Electronics, Inc., Costa Mesa, Calif.

The phase monitor 48 receives the two vibration signals generated by the accelerometers 30, 34 and compares the two signals to generate a phase angle and an output signal representative of the same. For example, the phase monitor 48 receives the two vibration signals and calculates the phase angle, which is the lead or lag in degrees from zero degrees (0°) to three hundred sixty degrees (360°) between the two signals. The phase monitor 48 then generates an output signal over a preselected range, e.g., 4–20 mA, indicative of the calculated phase angle. For instance, a 4 mA signal may be representative of a zero degrees (0°) phase angle, while a 20 mA signal may be representative of a three hundred sixty degrees (360°) phase angle, with the remaining angles proportioned therein between.

The output signal representative of the calculated phase angle is then supplied to the vibratory generator 20 via the line 42. As is well known, the speed of an AC squirrel cage type motor can be varied by varying frequency of the voltage applied thereto. Therefore, the vibratory generator 20 may be responsive to the output signal generated by utilizing the output signal to vary the voltage applied to the electric motor 22 to achieve the desired phase angle. In one example, the desired phase angle is one hundred eighty degrees (180°) but it will be understood that the desired phase angle may be any angle from zero degrees (0°) to three hundred sixty degrees (360°) depending upon the desired damping effect. Furthermore, the desired phase angle may be adjusted by varying the response of the vibratory generator 20 to the output signal, or by varying the output signal itself.

It will further be understood that the vibratory generator 20 may utilize the output signal in numerous other well known techniques to achieve the desired phase angle. For example, the output signal may be utilized to control an I/P transducer which converts current to pressure so as to adjust a movable motor weight to modify the vibratory generator 20. Moreover, the output signal may be supplied to a PID controller, a PLC controller, or the like to control the vibratory generator 20 as is also well known in the art.

Figure 3:
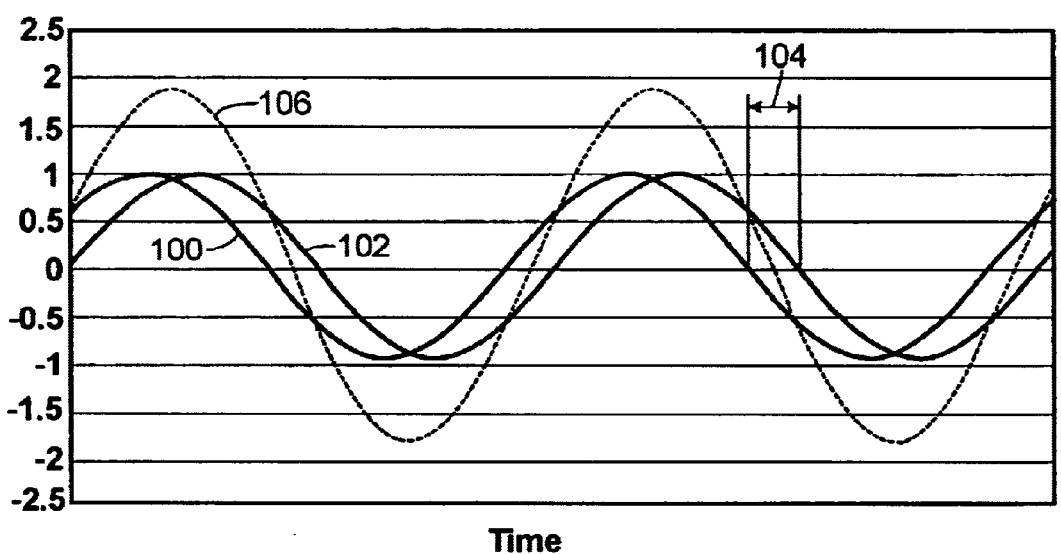
FIG. 3 is a graph plotting a measured vibratory response over time of a plurality of vibrating machines and a resultant sum vibratory response of the plurality of vibrating machines.

Turning to FIG. 3, there is shown an example graph plotting a measured vibratory response over time of the first vibratory apparatus 12 and the second vibratory apparatus 32 and a resultant sum vibratory response of the two vibrating machines. For example, over time, the first vibratory apparatus 12 may produce the first vibratory response line 100 while the second vibratory apparatus 32 may produce the second vibratory response line 102. The resultant sum vibratory response is illustrated for reference as line 106 and is calculated by summing the first and second vibratory response lines 100, 102.

In the example illustrated by FIG. 3, the phase angle controller 36 receives the first vibratory response (line 100) and the second vibratory response (line 102) and calculates the phase angle 104 to be thirty-seven degrees (37°). The phase angle controller 36 produces an output signal corresponding to the calculated phase angle (e.g., 5.64 mA) and supplies the output signal to the vibratory generator 20 via line 42. The vibratory generator 20 then varies the voltage applied to the electric motor 22 to increase (or decrease) the phase angle, and ultimately achieve the desired phase angle, which in this example is one hundred eighty degrees (180°).

Figure 4:
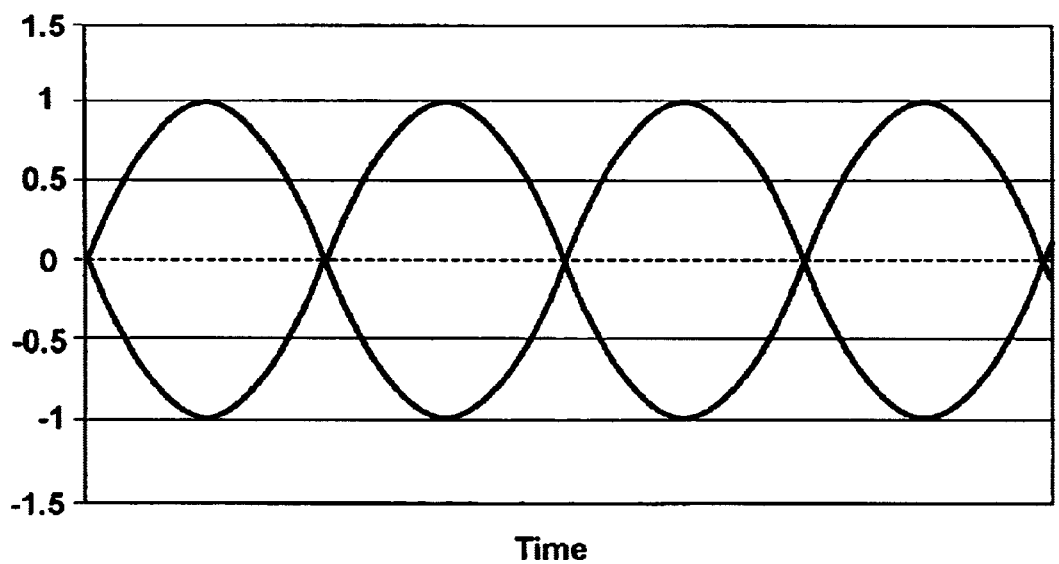
FIG. 4 is a graph plotting a measured vibratory response over time of the plurality of vibrating machines of FIG. 3, and a resultant sum vibratory response of the plurality of vibrating machines after phase monitoring by the apparatus of FIG. 1.

Turning now to FIG. 4, there is shown an example graph plotting a measured vibratory response over time of the first vibratory apparatus 12 and the second vibratory apparatus 32 and a resultant sum vibratory response of the two vibrating machines after the vibratory generator 20 has varied the voltage applied to the electric motor 22 to achieve a desired phase angle 204 of one hundred eighty degrees (180°). Specifically, the graph of FIG. 4 illustrates a first vibratory response line 200 one-hundred eighty degrees (180°) out of phase with a second vibratory response line 202. The resultant sum vibratory response is illustrated for reference as line 204 and is calculated by summing the first and second vibratory response lines 200, 202.

Although certain examples have been disclosed and described herein in accordance with the teachings of the present invention, the scope of coverage of this patent is not limited thereto. On the contrary, this patent covers all embodiments of the teachings of the invention fairly falling within the scope of the appended claims, either literally or under the doctrine of equivalents.

What is claimed is:

1. A phase monitoring apparatus for phase monitoring a vibratory system comprising:

a first vibratory apparatus adapted to produce a vibratory movement;

a first accelerometer supported by the first vibratory apparatus, the first accelerometer adapted to sense the vibratory movement of the first vibratory apparatus and generate a first signal representative of the vibratory movement of the first vibratory apparatus;

a second vibratory apparatus adapted to produce a vibratory movement;

a second accelerometer supported by the second vibratory apparatus, the second accelerometer adapted to sense the vibratory movement of the second vibratory apparatus and generate a second signal representative of the vibratory movement of the second vibratory apparatus; and a phase angle controller coupled to the first accelerometer and adapted to receive the first signal representative of the vibratory movement of the first vibratory apparatus, the phase angle controller further coupled to the second accelerometer and adapted to receive the second signal representative of the vibratory movement of the second vibratory apparatus, wherein the phase angle controller is further adapted to produce an output signal representative of a phase angle between the first signal and the second signal.

2. The apparatus of claim 1, wherein the first vibratory apparatus further comprises a vibratory generator for producing the vibratory movement, the vibratory generator being coupled to the phase angle controller and the vibratory generator being adapted to receive the output signal from the phase angle controller to adjust the vibratory movement of the first vibratory apparatus.

3. The apparatus of claim 2, wherein the vibratory generator adjusts the vibratory movement of the first vibratory apparatus such that the resultant phase angle is one hundred eighty degrees (180°).

4. The apparatus of claim 1, wherein the first vibratory apparatus is a single-mass vibratory apparatus.

5. The apparatus of claim 1, wherein the first vibratory apparatus is a two-mass vibratory apparatus.

6. A phase angle control system for use in a vibratory system having a first vibratory apparatus adapted to produce a first vibratory movement and a second vibratory apparatus adapted to produce a second vibratory movement, the phase angle controller comprising:

- a first accelerometer operatively coupled to the first vibratory apparatus, for sensing the first vibratory movement and generating a first signal representative of the first vibratory movement;
- a second accelerometer operatively coupled to the second vibratory apparatus, for sensing the second vibratory movement and generating a second signal representative of the second vibratory movement;
- a phase monitor coupled to the first and second accelerometers and adapted to receive the first signal representative of the first vibratory movement and adapted to receive the second signal representative of the second vibratory movement, wherein the phase monitor produces an output signal representative of a phase angle between the first signal and the second signal.

7. The apparatus of claim 6, in which the first vibratory apparatus further comprises a vibratory generator for producing the vibratory movement, and in which the phase monitor is operatively coupled to the vibratory generator to adjust the vibratory movement of the first vibratory apparatus.

8. A vibratory system having a phase monitoring apparatus, the system comprising:

- a first vibratory apparatus adapted to produce a vibratory movement;
- a first accelerometer operatively coupled to the first vibratory apparatus, the first accelerometer adapted to sense the vibratory movement of the first vibratory apparatus and generate a first signal representative of the vibratory movement of the first vibratory apparatus;
- a first amplifier coupled to the first accelerometer to receive the first signal representative of the vibratory movement of the first vibratory apparatus and to produce an amplified first signal representative of the vibratory movement of the first vibratory apparatus;
- a second vibratory apparatus adapted to produce a vibratory movement;
- a second accelerometer operatively coupled to the second vibratory apparatus, the second accelerometer adapted to sense the vibratory movement of the second vibratory apparatus and generate a second signal representative of the vibratory movement of the second vibratory apparatus;
- a second amplifier coupled to the second accelerometer to receive the second signal representative of the vibratory movement of the second vibratory apparatus and to produce an amplified second signal representative of the vibratory movement of the second vibratory apparatus; and
- a phase angle controller coupled to the first amplifier and adapted to receive the amplified first signal representative of the vibratory movement of the first vibratory apparatus, the phase angle controller further coupled to the second amplifier and adapted to receive the amplified second signal representative of the vibratory movement of the second vibratory apparatus, wherein the phase angle controller is further adapted to produce an output signal representative of a phase angle between the amplified first signal and the amplified second signal.

9. The system of claim 8, in which the first vibratory apparatus further comprises a vibratory generator for producing the vibratory movement, and in which the phase monitor is operatively coupled to the vibratory generator to adjust the vibratory movement of the first vibratory apparatus.

* * * * *